United States Patent

[11] 3,613,971

| [72] | Inventor | George J. Betz |
| | | 4720 N.E. 31st Ave., Portland, Oreg. 97211 |
| [21] | Appl. No. | 823,720 |
| [22] | Filed | May 12, 1969 |
| [45] | Patented | Oct. 19, 1971 |

[54] COMBINATION SPARE WHEEL HOLDER AND STEP FOR PICKUP TRUCKS
8 Claims, 5 Drawing Figs.

[52] U.S. Cl. ..................................... 224/42.01,
224/42.21, 280/164, 224/42.06
[51] Int. Cl. ...................................... B60r 3/00
[50] Field of Search .......................... 280/163,
164, 150 A; 224/42.01, 42.03, 42.04, 42.06,
42.08, 42.12, 42.21; 214/451, 454

[56] References Cited
UNITED STATES PATENTS

| 1,485,355 | 2/1924 | Williamson .................... | 280/164 |
| 1,866,013 | 7/1932 | Coquille ........................ | 224/42.21 X |
| 2,593,908 | 4/1952 | Monteverde .................. | 224/42.08 |
| 3,186,612 | 6/1965 | Lyles ............................. | 224/42.01 |
| 3,187,914 | 6/1965 | Peras ............................ | 224/42.21 X |
| 3,343,736 | 9/1967 | Sellers .......................... | 224/42.21 X |
| 3,507,514 | 4/1970 | Betz .............................. | 280/164 |

*Primary Examiner*—Gerald M. Forlenza
*Assistant Examiner*—Robert J. Spar
*Attorney*—Eugene M. Eckelman ABSTRACT: A flat platelike holder has a threaded lug for securing a spare wheel flatwise thereagainst. This holder has lower extensions pivotally connected to brackets in turn arranged to be secured to the bumper of a pickup truck. A spring operated catch is used for maintaining the holder in a vertical position and when released allows the holder to lower to a horizontal position. The vertical supporting position of the wheel holder comprises the normal or travelling position and the horizontal position of such holder comprises a position for use as a step. The lower extensions of the holder have a bottom edge adapted to serve as a stop against the bumper mounted brackets to hold the step in a substantially horizontal position, and springs are provided between the holder and the bumper mounting brackets to resist partly the lowering rotatable movement of the wheel and its holder. A release cable secured to the spring operated catch extends into a portion of the truck for emergency release of the step if necessary, and a safety chain is connected between the vehicle and an upper portion of the step to limit the amount of downward rotation of the step when desired.

PATENTED OCT 19 1971

GEORGE J. BETZ
INVENTOR.
BY Eugene M. Eckelman
ATTY.

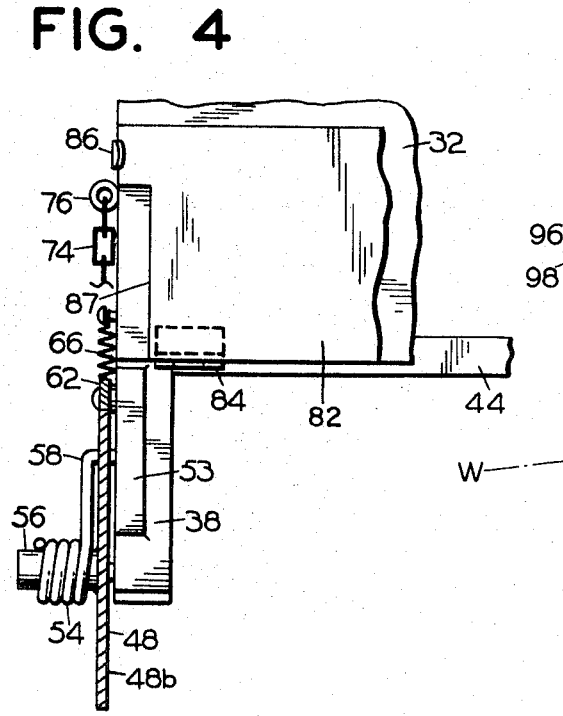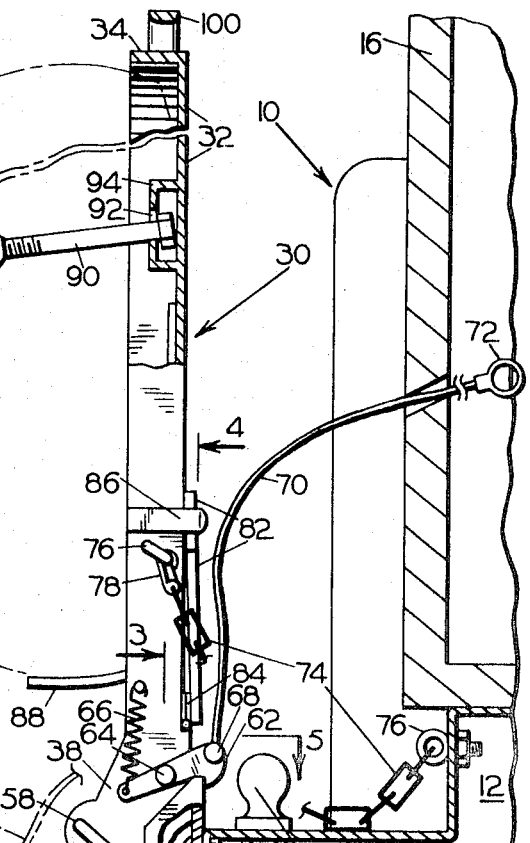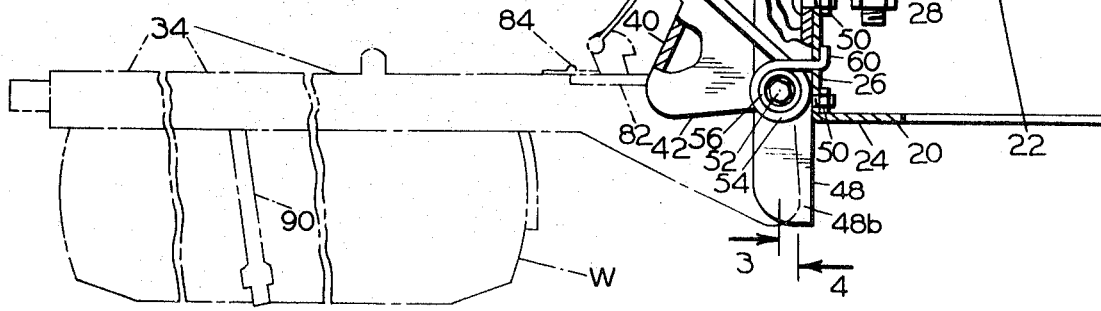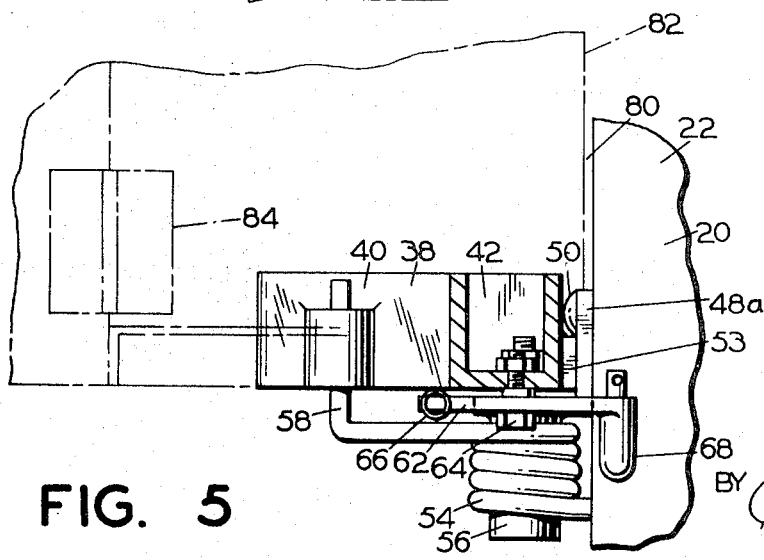

3,613,971

COMBINATION SPARE WHEEL HOLDER AND STEP FOR PICKUP TRUCKS

BACKGROUND OF THE INVENTION

This invention relates to new and useful improvements in spare wheel holders for pickup trucks and more particularly is concerned with such a holder which can also serve as a step.

In the conventional pickup type truck, the spare wheel is generally carried on one side of the vehicle or is suspended under the frame. When the wheel is carried on the side of the vehicle it is in the way for proper use of the vehicle such as in loading and unloading. When the spare wheel is carried underneath the vehicle it is difficult to mount and demount in the event of a flat tire. Also, various types of rear steps have been provided for pickup type campers to assist persons in gaining access to a rear door of the camper. Such steps generally are releasably attached to the pickup truck or are permanently attached and swung up into the camper housing when not in use. The present invention is intended to overcome the difficulty in carrying a spare wheel on pickup type trucks and at the same time to provide a spare wheel holder which can be used as a step. A particular objective of the present invention is to provide such an apparatus which is efficient for its intended purpose and which can be readily attached to the bumper of a pickup truck.

Further objects of the present invention are to provide a combination spare wheel holder and step for pickup type trucks which is relatively simple in its structure for economy of manufacture, which is spring loaded to facilitate easy lowering and raising of the step as well as providing nonhazardous operation, which is designed such that it does not interfere with the use of a trailer hitch on the bumper, which has safety means facilitating only partial lowering at selected times to prevent accidental lowering of the step against a device being pulled by the truck, and which employs a safety release which may extend interiorly of the truck for emergency lowering of the step under control of persons within the truck.

The invention will be better understood and additional objects and advantages will become apparent from the following description taken in connection with the accompanying drawings which illustrate the device.

BRIEF DESCRIPTION OF THE DRAWINGS

FIG. 2 is a fragmentary elevational view, partly broken away, taken on the line 2—2 of FIG. 1;

FIG. 4 is a fragmentary sectional view taken on the line 4—4 of FIG. 2; and

FIG. 5 is a sectional view taken on the line 5—5 of FIG. 2.

DESCRIPTION OF THE PREFERRED EMBODIMENT

Figure 1:
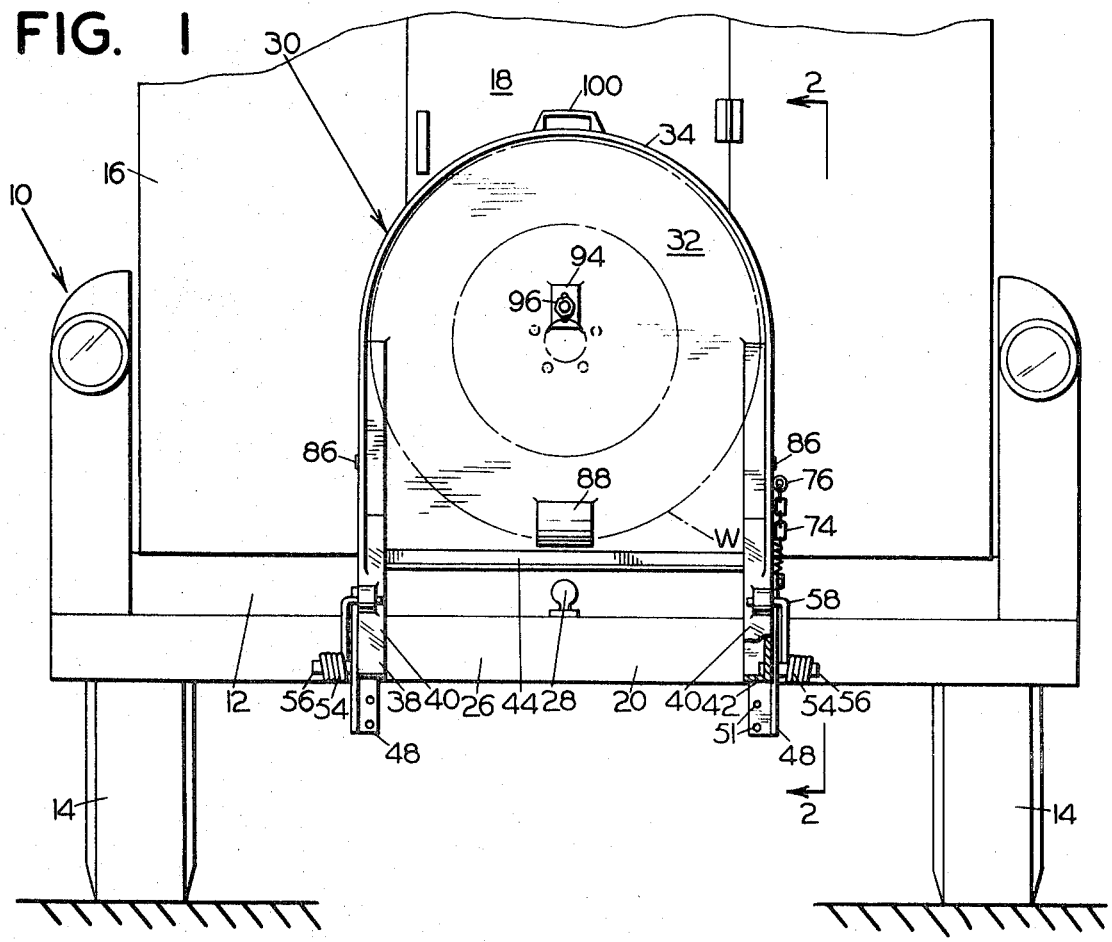
FIG. 1 is a fragmentary rear elevational view of a pickup type truck showing the present combination spare wheel holder and step attached thereto.

Referring in particular to the drawings and first to FIGS. 1 and 2, the numeral 10 designates generally a pickup type truck having frame means 12 and wheels 14. For purposes of illustration, a camper housing 16 is shown mounted in position on the truck, and in the usual case such housing has a rear door 18. The present invention is particularly applicable for use with a widened bumper 20 which is in common use at the present and referred to in the trade as a utility bumper. Such bumpers are channel shaped, having a top wall 22, a bottom wall 24, and a vertical front wall 26. A ball portion 28 of a trailer hitch is secured to the upper wall 22 of the bumper.

The present invention comprises a combination step and wheel holder designated generally by the numeral 30 which includes a plate 32 of sufficient rigidity to form a step in a horizontal position of such holder. Plate 32 has a rearwardly turned flange 34 providing rigidity thereto. The bottom ends of flange 34 lead into extensions 38 assuming a channel shape, FIG. 5, with the open portion of the channel facing inwardly. The bottom extensions 38 are tapered to a larger dimension toward the bottom, having a front angled surface 40 and a flat bottom surface 42, the surfaces 40 and 42 being identified as front and bottom surfaces, respectively, as considering the wheel holder or step in its upright position.

A reinforcing angle iron 44 extends laterally across between the flange 34 at the bottom edge of the plate 32 for providing reinforcement of the plate intermediate the sides of the frame.

Figure 3:
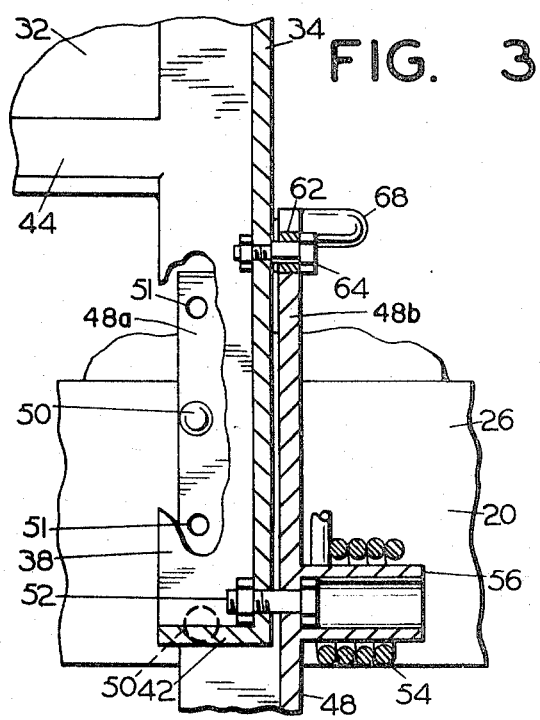
FIG. 3 is an enlarged fragmentary sectional view taken on the line 3—3 of FIG. 2.

A pair of mounting brackets 48 are secured in upright position against the front wall of bumpers 20 by means of bolts 50 received through holes 51 in the brackets and suitable holes in the bumper and such brackets comprise angle irons having a flat body portions 48a, FIGS. 3 and 5, bolted flat against the bumper 20 and a web portion 48b, FIGS. 2 and 3, projecting outwardly. Bracket portions 48a have multiple holes 51, FIG. 3, for providing vertical adjustment. A pivotal connection is provided between the wheel holder and the mounting brackets 48 by pivot bolts 52, FIGS. 2 and 3, extending through the webs 48b and the sidewall of bottom extensions 38 of the flanges 34 on the wheel mounting plate 32. Pivot bolts 52 permit the wheel holder to be swung to a vertical position as shown in full lines in FIGS. 1 and 2 or to a horizontal position shown in phantom lines in FIGS. 2 and 5. The wheel holder will rotate counterclockwise, FIG. 2, only to a horizontal position and is stopped by engagement of bottom surfaces 42 of extensions 38 with the body portion 48a of the mounting brackets 48. Bracket mounting bolts 50 are offset toward the edge of bracket body portion 48a, and shim plates 53, FIGS. 4 and 5, are integrated with the back portion of the bottom extensions for engagement with bracket portions 48a to one side of bolts to To prevent the wheel and holder from falling too fast and to assist in raising such assembly, coil springs 54 are mounted on tubular projections 56 integral with the mounting brackets 48 and enclosing the head of pivot bolts 52. One end 58 of the coil springs 54 is anchored in the extensions 38 and the other end 60 is anchored to stationary means such as to the bumper as shown or if desired to the mounting brackets 48. The spring connections are accomplished by providing suitable apertures in the respective members. Upon lowering the step, the spring is wound up, and while it has sufficient strength to cause the step to lower gently and also to assist in raising the step, the relationship is such that the weight of the step will overcome the force of the spring so that the step will remain in a lowered position by itself when so placed.

The step is held in its vertical position by a latch or dog 62 pivotally attached to the outer side, by means of a pivot pin 64, of one of the extensions 38. Latch 62 is arranged for latching engagement with an upper end of the associated mounting bracket 48, as best seen in FIG. 2. The latch is biased toward latching position by a tension spring 66 arranged such that as the wheel holder reaches its vertical position the latch engages the bracket 48 to hold the wheel holder vertically. When it is desired to lower the wheel holder, the latch is manually disengaged from the bracket 48, and for this purpose the latch has a laterally projecting knob 68 for easy manipulation by the operator.

Also associated with the latch 62 is a safety release 70 in the form of a cable having one end secured to the engaging of the latch and the other end extending into the truck and terminating in an eye 72 whereby the latch 62 can be released from inside the truck. The purpose of such structure is to allow persons riding within a camper or the like to release the wheel holding step in the event of an emergency since it is apparent that the wheel holding step prevents the opening of the back door 18 of the truck. Since such wheel holding step prevents the opening of the door 18, it is apparent also that it normally will act as a safety feature against accidental opening of the door.

The present device is provided with another safety feature which is designed to prevent the wheel holder from pivoting to a full down position when not so intended. For this purpose, a chain 74 is connected between eyebolts 76 on the wheel holder 30 and on the truck bumper 20 and is of a length such that the wheel holder can pivot down only a partial distance. The chain at its outer end has a latch hook 78 which provides ready attachment or detachment to the one eyebolt 76. The chain 74 serves as a safety feature which although of a length to allow the wheel holder to pivot down sufficiently to allow the door 18 of the truck to open nevertheless prevents such wheel holder from rotating an amount to engage against a device which is at the time being pulled by the truck. Thus, the chain 74 allows proper use of the safety release 70 but at the same time prevents the wheel holder from damaging a device being pulled should the latch 62 become accidentally released.

As best seen in FIG. 1, when the holder is in an upright position the lower edge of the plate 32, which terminates at the cross brace 44, is sufficiently above the bumper to permit a trailer to be hitched to the ball portion 28 of the hitch. In the lowered position of the holder, an opening or space 80, FIG. 5, thus exists between the cross brace 44 and the front edge of the bumper. To cover this opening when the holder is down, the present invention employs an auxiliary plate 82 FIGS. 2, 4 and 5, pivotally connected by hinges 84 to the cross brace 44 and arranged to lie over opening 80 when the wheel holder is down. It is desired that the plate 82 be swung upwardly out of the way against the back side of the wheel holder when the latter is in its vertical position, and said plate 82 is held in such upright inoperative position by a pair of spring latch fingers 86 secured on the flange 34 and arranged for detachable engagement with such plate. FIG. 5 shows in phantom position the operative position of the plate 82 to cover the opening 80 when the wheel holder is down. Plate 82 has side support in its operative position on the side extensions 38 of the wheel holder, and its upper surface is substantially flush with the top surface of the bumper 20. Said plate has side notches 87, FIG. 4, to receive the shim plates 53 when the auxiliary plate 82 is folded down.

Plate 32 has a cradle arm 88, FIGS. 1 and 2, adjacent its bottom for supporting a wheel W. In addition, a threaded stud 90 is secured to the plate 32 for insertion through a stud receiving aperture of the wheel. In a preferred arrangement, the stud at its connected end with the plate 32 projects loosely through an aperture 92 in a boxlike frame 94 integrated with the plate 32. Aperture 92 is smaller than the head of the stud 90 so that while the stud is secured to the plate 32 it nevertheless can extend at variable angles relative to said plate in order to be made to extend through lug holes of wheels of different diameters, thus eliminating the necessity of custom fitting the present device to different sizes of wheels. Secured connection of the stud 90 to the wheel is accomplished by a nut 96. Stud 90 has a diametral bore 98 adjacent its outer end for receiving suitable locking means, such as a padlock, to prevent wrongful removal of the spare wheel. A handle 100 is provided on the top of the wheel holder for manipulation of the latter.

In the use of the present invention, the holder is latched in its upright position when the truck is on the road or at times when access to the rear of the truck is not desired. At such times, it may be desired to latch the chain 74 with the wheel holder to prevent it from falling down, which although it will not fall hard may cause damage to a device being towed behind the truck. To lower the wheel holder, the operator releases the chain 74 if such has been attached, and then the latch 62 is released whereupon the wheel holder can pivot to its down position. The spring causes gentle downward rotation of the wheel holder. After the wheel holder is down, the plate 82 is rotated away from the outer end of the wheel holder in order to cover the space 80 between the plate 32 and the bumper.

In addition to providing a combination wheel holder and step, the present mechanism has the feature that it supports the spare wheel in an easily accessible position. In addition, such spare wheel is not in the way of the load in the truck and further yet such holder in its upright position serves as a safety stop for accidental opening of the camper door when the truck is travelling. Although the present device has been described for use with a pickup type truck, it may be used with any type of vehicle.

It is to be understood that the form of my invention herein shown and described is to be taken as a preferred example of the same and that various changes in the shape, size and arrangement of parts may be resorted to without departing from the spirit of my invention.

Having thus described my invention, I claim:

1. A combination spare wheel holder and step for use with a vehicle bumper having an upright rear edge, comprising a wheel holding frame having an upper end portion and a lower end portion provided with a frame extension having a bottom end, a flat step surface on said wheel holding frame adjacent said upper end portion, means on the other side of said wheel holding frame from said step surface for detachably supporting a spare wheel thereon, and means arranged to pivotally attach said wheel holding frame at said lower end frame extension to the bumper whereby said wheel holding frame is rotatable between an upright position and a substantially horizontal position, said flat step surface being arranged to face upwardly in a horizontal position of said wheel holding frame to serve as a step surface, said frame extension terminating at its bottom end in a flat edge disposed substantially in a horizontal plane in the upright position of said wheel holding frame, the pivotal axis of said frame being located above the flat bottom edge when the frame is in an upright position, said flat bottom edge being arranged to engage against an upright surface supported by the bumper in the horizontal position of said wheel holding frame to hold the latter in stopped horizontal position.

2. The spare wheel holder and step of claim 1 wherein said means arranged to pivotally attach said wheel holding frame to a bumper comprises a bracket arranged to be secured to the bumper and means pivotally connecting said frame extension to said bracket.

3. The spare wheel holder and step of claim 1 wherein said means arranged to pivotally attach said wheel holding frame to a bumper comprises an angle bracket having a first wall arranged to be secured flatwise against the bumper and having a second wall projecting outwardly and means pivotally connecting said frame extension to said bracket.

4. The spare wheel holder and step of claim 3 wherein said flat bottom edge is arranged to engage the said first wall of said bracket in the horizontal position of said wheel holding frame.

5. The spare wheel holder and step of claim 3 including coil spring means having one end connected to said frame extension and its other end arranged to be anchored to the bumper, said spring means being arranged to bear some of the rotative weight of said wheel holding frame.

6. The spare wheel holding frame and step of claim 3 including latch means on said frame extension arranged for releasable engagement with said bracket for holding said wheel holding frame in its vertical position or for releasing the latter for rotation to its horizontal position.

7. The spare wheel holding frame and step of claim 3 including latch means on said frame extension arranged for releasable engagement with said bracket for holding said wheel holding frame in its vertical position or for releasing the latter for rotation to its horizontal position, and remote control means connected to said latch means for releasing said latch from a remote point.

8. The spare wheel holding frame and step of claim 1 wherein said step surface is spaced from the connection of said wheel holding frame with the bumper, and including an auxiliary plate pivotally attached to said wheel holding frame and arranged to be swung to a position to fill the space between said wheel holding frame and the bumper.